United States Patent
Iwaida

(10) Patent No.: US 7,460,850 B2
(45) Date of Patent: Dec. 2, 2008

(54) HIGH FREQUENCY RECEIVING CIRCUIT PROVIDED WITH CONTROLLER FOR TURNING ON AND OFF POWER SUPPLY TO LOCAL OSCILLATOR

(75) Inventor: Mineyuki Iwaida, Kyoto (JP)

(73) Assignee: Panasonic Corporation, Osaka (JP)

( * ) Notice: Subject to any disclaimer, the term of this patent is extended or adjusted under 35 U.S.C. 154(b) by 458 days.

(21) Appl. No.: 11/335,693

(22) Filed: Jan. 20, 2006

(65) Prior Publication Data

US 2006/0166638 A1 Jul. 27, 2006

(30) Foreign Application Priority Data

Jan. 21, 2005 (JP) .............................. 2005-014149

(51) Int. Cl.
*H04B 1/26* (2006.01)
(52) U.S. Cl. ...................... 455/318; 455/132; 455/255; 455/343.1; 455/574
(58) Field of Classification Search ................ 455/131, 455/132, 255, 313, 318, 323, 334, 343.1, 455/574
See application file for complete search history.

(56) References Cited

U.S. PATENT DOCUMENTS

| | | | | |
|---|---|---|---|---|
| 3,987,399 A | * | 10/1976 | Yokoyama | ................. 455/257 |
| 4,677,691 A | * | 6/1987 | Scott | .......................... 455/318 |
| 5,787,126 A | * | 7/1998 | Itoh et al. | .................... 375/324 |
| 5,835,853 A | * | 11/1998 | Enoki et al. | .............. 455/180.1 |
| 6,424,074 B2 | * | 7/2002 | Nguyen | ...................... 455/323 |

FOREIGN PATENT DOCUMENTS

| | | |
|---|---|---|
| EP | 1 562 307 | 8/2005 |
| JP | 2004-147082 | 4/2005 |

* cited by examiner

*Primary Examiner*—Quochien B Vuong
(74) *Attorney, Agent, or Firm*—Wenderoth, Lind & Ponack, L.L.P.

(57) ABSTRACT

A receiving circuit for receiving a high frequency signal is provided which includes a mixer, a local oscillator, a switch circuit, and a controller. The switch circuit switches over between first and second cases. The controller controls in the first case to turn on power supply to the local oscillator, and controls the switch circuit in the first case to output the local oscillation signal outputted from the local oscillator to the mixer, and to output the local oscillation signal through the local oscillation signal output terminal. The controller controls in the second case to turn off power supply to the local oscillator, and controls the switch circuit in the second case to output the local oscillation signal inputted through the local oscillation signal input terminal to the mixer.

14 Claims, 9 Drawing Sheets

HIGH FREQUENCY RECEIVING CIRCUIT PROVIDED WITH CONTROLLER FOR TURNING ON AND OFF POWER SUPPLY TO LOCAL OSCILLATOR

BACKGROUND OF THE INVENTION

1. Field of the Invention

The present invention relates to a high frequency receiving circuit for receiving a high frequency signal, and a receiving apparatus and a receiving system each utilizing the same high frequency receiving circuit. In particular, the present invention relates to a high frequency receiving circuit provided with a controller for turning on and off power supply to a local oscillator, and a receiving apparatus and a receiving system each utilizing the same high frequency receiving circuit.

2. Description of the Related Art

FIG. 9 is a block diagram showing a configuration of a radio receiving circuit according to a first prior art example. The radio receiving circuit shown in FIG. 9 includes an antenna 71, a high frequency amplifier 72, a frequency converter 400, a local oscillator 31, a band-pass filter 73, an intermediate frequency amplifier 74, a demodulator 75, and an output terminal 76. In this case, the frequency converter 400 includes a high frequency input terminal 10, a frequency-converted signal output terminal 11, an oscillation signal input terminal 12, and a mixer 20.

Referring to FIG. 9, a radio signal having a radio frequency $f_{RF}$ transmitted from a transmitter apparatus is received by the antenna 71, and then, the received radio signal is amplified with low noise by the high frequency amplifier 72. The low-noise amplified radio signal (referred to as a high frequency signal hereinafter) is inputted to a first input terminal of the mixer 20 through the high frequency signal input terminal 10. In addition, a local oscillation signal having a local oscillation frequency $f_{LO}$ generated by the local oscillator 31 is inputted to a second input terminal of the mixer 20 through the oscillation signal input terminal 12. The mixer 20 multiplies the high frequency signal inputted to the first input terminal by the local oscillation signal inputted to the second input terminal to generate a frequency-converted signal of a multiplied result which is frequency-converted, and outputs the same frequency-converted signal to the band-pass filter 73 through the frequency-converted signal output terminal 11. Then, the band-pass filter 73 band-pass-filters an intermediate frequency signal having a predetermined intermediate frequency $f_{IF}$ from the frequency-converted signal, and outputs the intermediate frequency signal to the demodulator 75 thorough the intermediate frequency amplifier 74. Further, the demodulator 75 demodulates the inputted intermediate frequency signal into a base band signal using a predetermined demodulating method, and outputs the base band signal to an external apparatus through the output terminal 76.

In the prior art example, in many cases, the frequency converter 400 is constituted by a semiconductor integrated circuit, and the local oscillator 31 is constituted by a resonance circuit including a transistor, an inductor, a capacitor and the like. However, only the transistor is incorporated in the semiconductor integrated circuit in some cases. In this case, the intermediate frequency $f_{IF}$ of the intermediate frequency signal is represented by the following equation (1) with the radio frequency $f_{RF}$ of the radio signal and the local oscillation frequency $f_{LO}$ of the local oscillation signal:

$$f_{IF} = |f_{RF} \pm f_{LO}| \quad (1).$$

In general, the frequency converter 400 converts the radio signal having the higher radio frequency $f_{RF}$ into the intermediate frequency signal having the lower intermediate frequency $f_{IF}$, and the intermediate frequency signal having the lower intermediate frequency $f_{IF}$ is demodulated by the demodulator 75.

FIG. 10 is a block diagram showing a radio receiving circuit according to a second prior art example. The radio receiving circuit of FIG. 10 is characterized by including a frequency converter 500 incorporating a local oscillator 30 instead of the frequency converter 400 as compared with the radio receiving circuit of FIG. 9. Referring to FIG. 10, the local oscillator 30 includes a transistor and a resonance circuit, and the frequency converter 500 does not have a local oscillation signal input terminal 12. In addition, when an inductor and a capacitor of the resonance circuit used in the local oscillator 30 of the frequency converter 500 are provided on the semiconductor integrated circuit, a small frequency converter can be provided.

FIG. 11 is a block diagram showing a configuration of a diversity radio receiving apparatus according to a third prior art example. The diversity radio receiving apparatus of FIG. 11 has radio receiving apparatuses of two systems shown in FIG. 9, and the diversity radio receiving apparatus is characterized by further including a switch 77 and a diversity controller 80 as compared with the radio receiving apparatus of FIG. 9. The radio receiving apparatus of the second system is provided with an antenna 71a, a high frequency amplifier 72a, a frequency converter 400a, a band-pass filter 73a, an intermediate frequency amplifier 74a, and a demodulator 75a, and is constituted in a manner similar to that of the radio receiving apparatus of FIG. 9. In this case, an antenna 71 and the antenna 71a are provided at different positions. In addition, the frequency converter 400a is provided with a high frequency input terminal 10a, a frequency-converted signal output terminal 11a, an oscillation signal input terminal 12a, and a mixer 20a, and the frequency converter 400a is constituted in a manner similar to that of the frequency converter 400.

A local oscillation signal generated by the local oscillator 31 is inputted to a mixer 20 through a local oscillation signal input terminal 12, and is inputted to the mixer 20a through the local oscillation signal input terminal 12a. In addition, a demodulated base band signal outputted from a demodulator 75 is outputted to an output terminal 76 through a contact "a" of the switch 77, and a demodulated base band signal outputted from the demodulator 75a is outputted to the output terminal 76 through a contact "b" of the switch 77a. The diversity controller 80 switches over the switch 77 so as to select the base band signal having a higher signal quality, based on a signal quality such as a bit error rate of each base band signal outputted from each of the demodulators 75 and 75a.

According to the diversity radio receiving apparatus shown in FIG. 11, high frequency signals having the same radio frequency $f_{RF}$ are inputted to the high frequency signal input terminals 10 and 10a of the frequency converters 400 and 400a, respectively. Since one local oscillator 31 generates local oscillation signals having the same frequency $f_{LO}$ and supplies them to the two local oscillators 400 and 400a, frequency-converted signals having the same frequency-converted component are outputted to the frequency-converted signal output terminals 11 and 11a of the two frequency converters 400 and 400a according to the above equation (1). In this case, the signals of the same frequency is inputted to the two high frequency signal input terminal 10 and 10a, however, since radio signals received by the antennas 71 and 71a positioned at different positions are inputted thereto, the frequency-converted signals outputted from the two frequency-converted signal output terminals 11 and 11a are different in signal state in many cases. Thus, by selecting the base band signal from the demodulator 75 or 75a corresponding to the frequency-converted signal output terminals 11 or 11a which is superior in receiving state and having a preferable signal quality (a signal level of the frequency-converted signal is higher, for example), the receiving state is remarkably improved. In addition, since the configuration of the diversity radio receiving apparatus shown in FIG. 11 is very effective at the time of moving reception, it is disclosed in the Japanese Patent Laid-open Publication No. JP-2004-147082-A, for example.

FIG. 12 is a block diagram showing a configuration of a diversity radio receiving apparatus according to a fourth prior art example. The diversity radio receiving apparatus shown in FIG. 12 is different from the diversity radio receiving apparatus shown in FIG. 11 in the following points.

(a) The frequency converter 500 shown in FIG. 10 is provided instead of the frequency converter 400 and the local oscillator 31 shown in FIG. 11.

(b) A frequency converter 500a having a configuration similar to that of the frequency converter 500 shown in FIG. 10 is provided instead of the frequency converter 400a and the local oscillator 31 shown in FIG. 11.

In this case, the frequency converter 500a is provided with a high frequency signal input terminal 10a, a frequency-converted signal output terminal 11a, a local oscillator 30a, and mixer 20a.

According to the diversity radio receiving apparatus shown in FIG. 12 having the above configuration, its size becomes large because of provision of the frequency converters 500 and 500a. However, its size can be reduced since the frequency converters 500 and 500a incorporate the local oscillators 30 and 30a, respectively.

According to the radio receiving apparatus shown in FIG. 10, an entire size of the radio receiving apparatus including the local oscillator 30 can be reduced as compared with the radio receiving apparatus shown in FIG. 9. However, a local oscillation signal cannot be inputted from an external circuit of the frequency converter 500, and the radio receiving apparatus cannot be flexibly constituted.

In addition, according to the diversity radio receiving apparatus of FIG. 12, since the local oscillator 30 and 30a are incorporated in the respective frequency converters 500 and 500a, the frequency converters 500 and 500a requires the local oscillator 30 and 30a, respectively. In the example shown in FIG. 12, two local oscillator 30 and 30a operate. As a result, although its size can be reduced as compared with the configuration of FIG. 11, the current consumption for one local oscillator increases. In addition, the signal interference between the local oscillators 30 and 30a generates since the local oscillation signal leaks to the other frequency converter, and this leads to deterioration in the signal quality of the received radio signal.

SUMMARY OF THE INVENTION

An essential object of the present invention is to provide a receiving circuit capable of solving the above problems, having a configuration simpler than that of the prior art examples, and reducing the power consumption thereof.

Another object of the present invention is to provide a receiving apparatus and a receiving system each using the same receiving circuit.

In order to achieve the aforementioned objective, according to one aspect of the present invention, there is provided a receiving circuit including a local oscillation signal output terminal and a local oscillation signal input terminal. The receiving circuit includes a mixer, a local oscillator, a first switch circuit, and a controller. The mixer mixes an inputted high frequency signal with an inputted local oscillation signal by multiplication to convert the high frequency signal into a predetermined frequency-converted signal, and outputs the frequency-converted signal. The local oscillator generates a local oscillation signal having a predetermined local oscillation frequency, and outputs the local oscillation signal. The first switch circuit switches over between first and second cases. The first switch circuit in the first case outputs the local oscillation signal outputted from the local oscillator to the mixer, and outputs the local oscillation signal through the local oscillation signal output terminal. The first switch circuit in the second case outputs a local oscillation signal inputted through the local oscillation signal input terminal to the mixer. The controller controls in the first case to turn on power supply to the local oscillator, and controls the first switch circuit in the first case to output the local oscillation signal outputted from the local oscillator to the mixer, and to output the local oscillation signal through the local oscillation signal output terminal. The controller controls in the second case to turn off power supply to the local oscillator, and controls the first switch circuit in the second case to output the local oscillation signal inputted through the local oscillation signal input terminal to the mixer.

The above-mentioned receiving circuit further includes a local oscillation signal input and output terminal, and a second switch circuit. The second switch circuit switches over between the first and second cases. The second switch circuit in the first case outputs the local oscillation signal outputted from the local oscillator through the local oscillation signal output terminal and the local oscillation signal input and output terminal, and the second switch circuit in the second case outputs the local oscillation signal inputted through the local oscillation signal input and output terminal to the mixer through the local oscillation signal input terminal and the first switch circuit. The controller further controls the second switch circuit in the first case to output the local oscillation signal outputted from the local oscillator through the local oscillation signal output terminal and the local oscillation signal input and output terminal, and controls the second switch circuit in the second case to output the local oscillation signal inputted through the local oscillation signal input and output terminal to the mixer through the local oscillation signal input terminal and the first switch circuit.

According to another aspect of the present invention, there is provided a receiving apparatus including a plurality of receiving circuits which include first and second receiving circuits. Each of the first and second receiving circuits includes a mixer, a local oscillator, a first switch circuit, and a controller. The mixer mixes an inputted high frequency signal with an inputted local oscillation signal by multiplication to convert the high frequency signal into a predetermined frequency-converted signal, and outputs the frequency-converted signal. The local oscillator generates a local oscillation signal having a predetermined local oscillation frequency, and outputs the local oscillation signal. The first switch circuit switches over between first and second cases. The first switch circuit in the first case outputs the local oscillation signal outputted from the local oscillator to the mixer, and outputs the local oscillation signal through the local oscillation signal output terminal. The first switch circuit in the second case outputs a local oscillation signal inputted through the local oscillation signal input terminal to the mixer. The controller controls in the first case to turn on power supply to the local oscillator, and controls the first switch circuit in the first case to output the local oscillation signal outputted from the local oscillator to the mixer, and to output the local oscillation signal through the local oscillation signal output terminal. The controller controls in the second case to turn off power supply to the local oscillator, and controls the first switch circuit in the second case to output the local oscillation signal inputted through the local oscillation signal input terminal to the mixer. The local oscillation signal output terminal of the first receiving circuit is connected to the local oscillation signal input terminal of the second receiving circuit. The controller of the first receiving circuit controls the first receiving circuit to turn on power supply to the local oscillator, controls the first switch circuit to output the local oscillation signal outputted from the local oscillator to the mixer, and to output the local oscillation signal to the mixer of the second receiving circuit through the oscillation signal output terminal. The controller of the second receiving circuit controls the second receiving circuit to turn off power supply to the local oscillator, and controls the first switch circuit to and to output the local oscillation signal inputted through the local oscillation signal input terminal to the mixer.

According to a further aspect of the present invention, there is provided a receiving apparatus including a plurality of receiving circuits which include first and second receiving circuits. Each of the first and second receiving circuits includes a mixer, a local oscillator, a first switch circuit, a controller, a local oscillation signal input and output terminal, and a second switch circuit. The mixer mixes an inputted high frequency signal with an inputted local oscillation signal by multiplication to convert the high frequency signal into a predetermined frequency-converted signal, and outputs the frequency-converted signal. The local oscillator generates a local oscillation signal having a predetermined local oscillation frequency, and outputs the local oscillation signal. The first switch circuit switches over between first and second cases. The first switch circuit in the first case outputs the local oscillation signal outputted from the local oscillator to the mixer, and outputs the local oscillation signal through the local oscillation signal output terminal. The first switch circuit in the second case outputs a local oscillation signal inputted through the local oscillation signal input terminal to the mixer. The controller controls in the first case to turn on power supply to the local oscillator, and controls the first switch circuit in the first case to output the local oscillation signal outputted from the local oscillator to the mixer, and to output the local oscillation signal through the local oscillation signal output terminal. The controller controls in the second case to turn off power supply to the local oscillator, and controls the first switch circuit in the second case to output the local oscillation signal inputted through the local oscillation signal input terminal to the mixer. The second switch circuit switches over between the first and second cases, the second switch circuit in the first case outputting the local oscillation signal outputted from the local oscillator through the local oscillation signal output terminal and the local oscillation signal input and output terminal. The second switch circuit in the second case outputs the local oscillation signal inputted through the local oscillation signal input and output terminal to the mixer through the local oscillation signal input terminal and the first switch circuit. The controller further controls the second switch circuit in the first case to output the local oscillation signal outputted from the local oscillator through the local oscillation signal output terminal and the local oscillation signal input and output terminal, and controls the second switch circuit in the second case to output the local oscillation signal inputted through the local oscillation signal input and output terminal to the mixer through the local oscillation signal input terminal and the first switch circuit.

The local oscillation signal input and output terminal of the first receiving circuit is connected to the local oscillation signal input and output terminal of the second receiving circuit. The controller of the first receiving circuit controls the first receiving circuit to turn on power supply to the local oscillator, and controls the first and second switch circuits to output the local oscillation signal outputted from the local oscillator to the mixer, and to output the local oscillation signal to the mixer of the second receiving circuit through the local oscillation signal input and output terminal, the second switch circuit and the local oscillation signal input and output terminal. The controller of the second receiving circuit controls the second receiving circuit to turn off power supply to local oscillator, and controls the first and second switch circuits to output the local oscillation signal inputted from the first receiving circuit through the local oscillation signal input and output terminal to the mixer through the second switch circuit, the local oscillation signal input terminal and the first switch circuit.

In the above-mentioned receiving apparatus, the first receiving circuit further includes first phase shifter provided between the first switch circuit and the mixer, and the first phase shifter adjusts a phase shift amount of the local oscillation signal. The second receiving circuit further includes second phase shifter provided between the first switch circuit and the mixer, and the second phase shifter adjusts a phase shift amount of the local oscillation signal. The first and second controller controls the phase shift amount of the first phase shifter and the phase shift amount of the second phase shifter so that the phase of the local oscillation signal inputted to the mixer of the first receiving circuit and the phase of the local oscillation signal inputted to the mixer of the second receiving circuit become substantially in-phase.

In the above-mentioned receiving apparatus, the first receiving circuit further includes first phase shifter provided between the first switch circuit and the mixer, and the first phase shifter adjusts a phase shift amount of the local oscillation signal. The second receiving circuit further includes second phase shifter provided between the first switch circuit and the mixer, and the second phase shifter adjusts a phase shift amount of the local oscillation signal. The first and second controller controls the phase shift amount of the first phase shifter and the phase shift amount of the second phase shifter so that the phase of the local oscillation signal inputted to the mixer of the first receiving circuit and the phase of the local oscillation signal inputted to the mixer of the second receiving circuit become substantially in-phase.

The above-mentioned receiving apparatus further includes a diversity receiving device, and high frequency signals having substantially the same radio frequency are inputted to the mixer of the first receiving circuit and the mixer of the second receiving circuit. The diversity receiving device demodulates a first frequency-converted signal outputted from the mixer of the first receiving circuit into a first demodulated signal, and demodulates a second frequency-converted signal outputted from the mixer of the second receiving circuit into a second demodulated signal, and performs one of (a) a first processing of selecting and outputting a demodulated signal obtained from the frequency-converted signal and having a higher signal quality based on signal qualities of the first and the second frequency-converted signals, and (b) a second processing of selecting and outputting a demodulated signal having a higher signal quality based on signal qualities of the first and the second demodulated signals.

The above-mentioned receiving apparatus further includes a demodulator, and high frequency signals having different radio frequencies are inputted to the mixer of the first receiving circuit and the mixer of the second receiving circuit. The demodulator demodulates a first frequency-converted signal outputted from the mixer of the first receiving circuit into a first demodulated signal, and outputs the first demodulated signal. The demodulator demodulates a second frequency-converted signal outputted from the mixer of the second receiving circuit into a second demodulated signal, and outputs the second demodulated signal.

According to a still further aspect of the present invention, there is provided a receiving system including a first receiving apparatus, a second receiving apparatus, and an operation switching device, and the operation switching device selectively switches over between an operation of the first receiving apparatus and an operation of the second receiving apparatus.

According to a still more further aspect of the present invention, there is provided a receiving system including a first receiving apparatus, a second receiving apparatus, and an operation switching device, and the operation switching device selectively switches over between an operation of the first receiving apparatus and an operation of the second receiving apparatus.

Accordingly, according to the present invention, it is possible to control the power supply to the local oscillator and the local oscillation signal input and output terminal depending on the purposes of use, and the unnecessary power consumption of the local oscillator can be reduced.

Further, according to the present invention, in the receiving circuit including the local oscillator, it is also possible to reduce the unnecessary power consumption of the local oscillator. Therefore, a small-sized and low-power-consumption receiving apparatus can be realized, which is further capable of receiving a plurality of reception signals according to the case or status.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Preferred embodiments will be described with reference to the drawings hereinafter. In the following preferred embodiments, it is to be noted that components similar to each other are indicated by the same references.

First Preferred Embodiment

Figure 1:
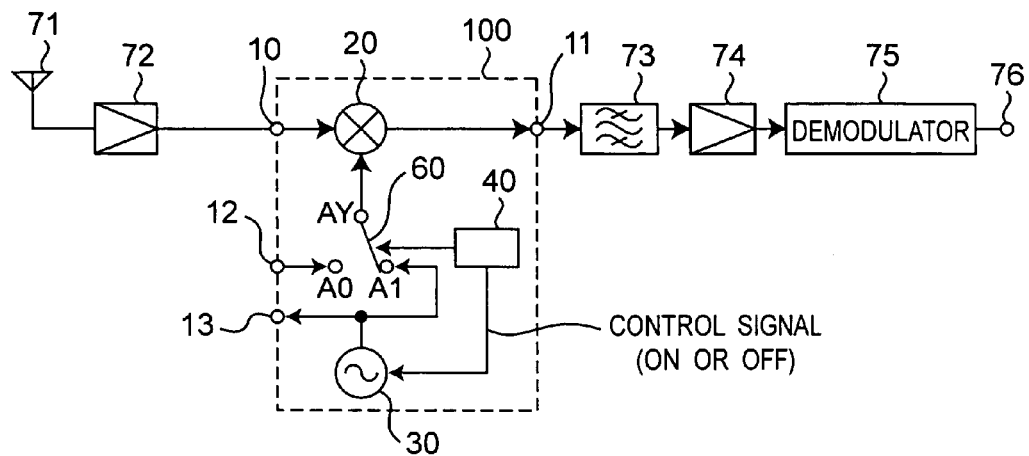
FIG. 1 is a block diagram showing a configuration of a radio receiving apparatus according to a first preferred embodiment of the present invention.
Figure 9:
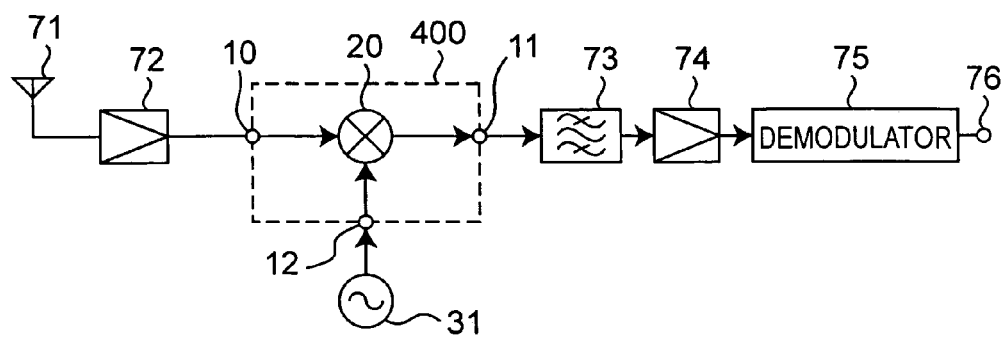
FIG. 9 is a block diagram showing a configuration of a radio receiving circuit according to a first prior art example.
Figure 10:
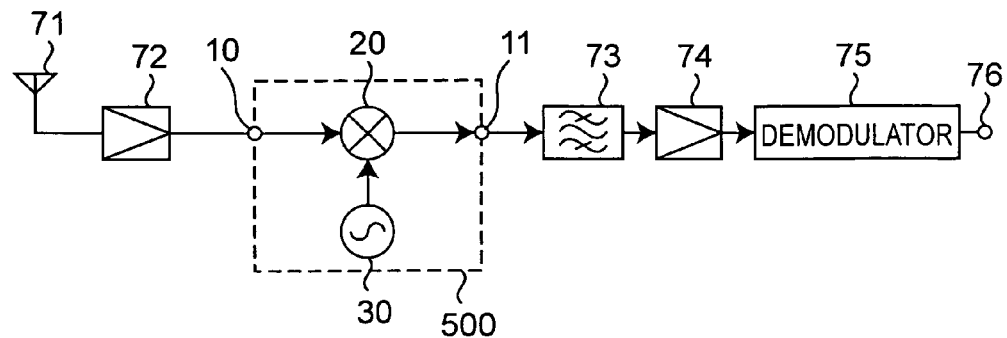
FIG. 10 is a block diagram showing a configuration of a radio receiving circuit according to a second prior art example.
Figure 11:
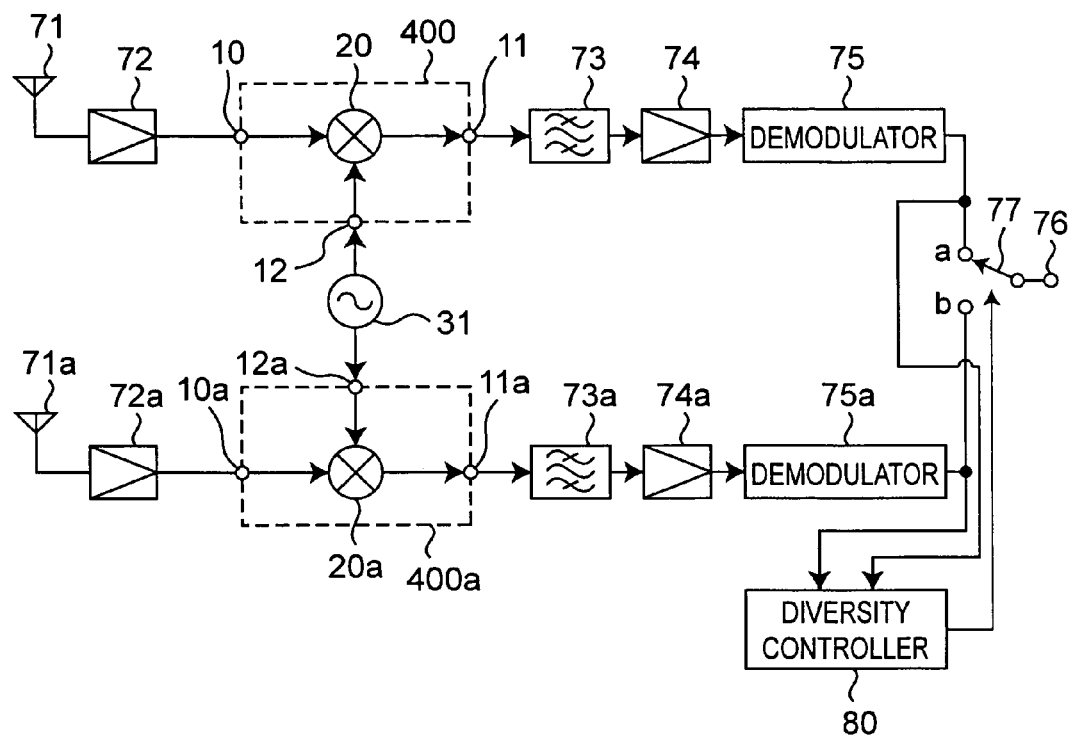
FIG. 11 is a block diagram showing a configuration of a diversity radio receiving apparatus according to a third prior art example.
Figure 12:
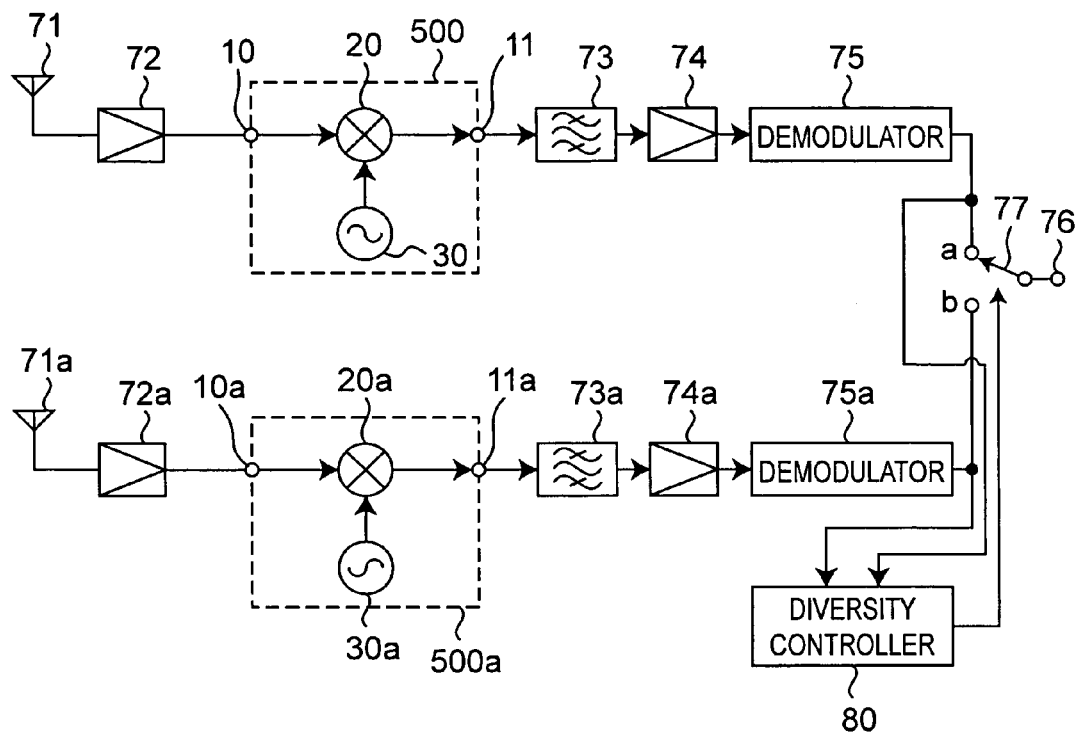
FIG. 12 is a block diagram showing a configuration of a diversity radio receiving apparatus according to a fourth prior art example.

FIG. 1 is a block diagram showing a configuration of a radio receiving apparatus according to a first preferred embodiment of the present invention. The radio receiving apparatus of FIG. 1 is characterized by including a receiving circuit having a frequency converter 100 instead of the frequency converter 400 and the local oscillator 31, as compared with the radio receiving apparatus shown in FIG. 9. The description will be made mainly on differences from the radio receiving apparatus shown in FIG. 9 hereinafter. In this case, the frequency converter 100 is provided with a high frequency signal input terminal 10, a frequency-converted signal output terminal 11, an oscillation signal input terminal 12, an oscillation signal output terminal 13, a mixer 20, a local oscillator 30, and a control circuit 40.

Referring to FIG. 1, a radio signal received by an antenna 71 is inputted via a high frequency amplifier 72 to a first input terminal of the mixer 20 through the high frequency signal input terminal 10 as a high frequency signal. A local oscillation signal generated by the local oscillator 30 is outputted to the local oscillation signal output terminal 13, and is outputted to a second input terminal of the mixer 20 through a contact A1 and a common terminal AY of a switch circuit 60. In addition, a local oscillation signal inputted from an external circuit through the local oscillation signal input terminal 12 is outputted to the second input terminal of the mixer 20 through a contact AO and the common terminal AY of the switch circuit 60. The control circuit 40 controls the switch circuit 60 so as to selectively switch over the switch circuit 60 to either the contact A1 or the contact A1 thereof, and controls turning on and off of operation of the local oscillator 30 using a control signal, that is, controls turning on and off of power supply to the local oscillator 30.

The mixer 20 multiplies the high frequency signal having a radio frequency $f_{RF}$ inputted to the first input terminal by the local oscillation signal having a local oscillation frequency $f_{LO}$ inputted to the second input terminal, to generate a frequency-converted signal whose frequency is converted according to the multiplied result, and outputs the same frequency-converted signal to a band-pass filter 73 through the frequency-converted signal output terminal 11. Then, the band-pass filter 73 band-pass-filters an intermediate frequency signal having a predetermined intermediate frequency $f_{IF}$ from the frequency-converted signal, and outputs a band-pass-filtered intermediate frequency signal to a demodulator 75 through an intermediate frequency amplifier 74. Then, the demodulator 75 demodulates the intermediate frequency signal into a base band signal using a predetermined demodulating method, and outputs a demodulated signal to the external apparatus through an output terminal 76.

According to the radio receiving apparatus having the above configuration, when the local oscillation signal from the local oscillator 30 incorporated in the frequency converter 100 is selected, the control circuit 40 turns on the power supply to the local oscillator 30, and switches over the switch circuit 60 to the contact A1 thereof. At this time, the local oscillation signal from the local oscillator 30 is outputted to the mixer 20 through the contact A1 and the common terminal AY of the switch circuit 60. On the other hand, when the local oscillation signal from the local oscillator 30 of the frequency converter 100 is not used, the oscillation signal from the external circuit is inputted through the oscillation signal input terminal 12. Then the control circuit 40 turns off the power supply to the local oscillator 30, and controls the switch circuit 60 so as to switch over to the contact A0 thereof. At this time, the local oscillation signal from the external circuit is outputted to the mixer 20 through the contact A0 and the common terminal AY of the switch circuit 60.

Figure 6:
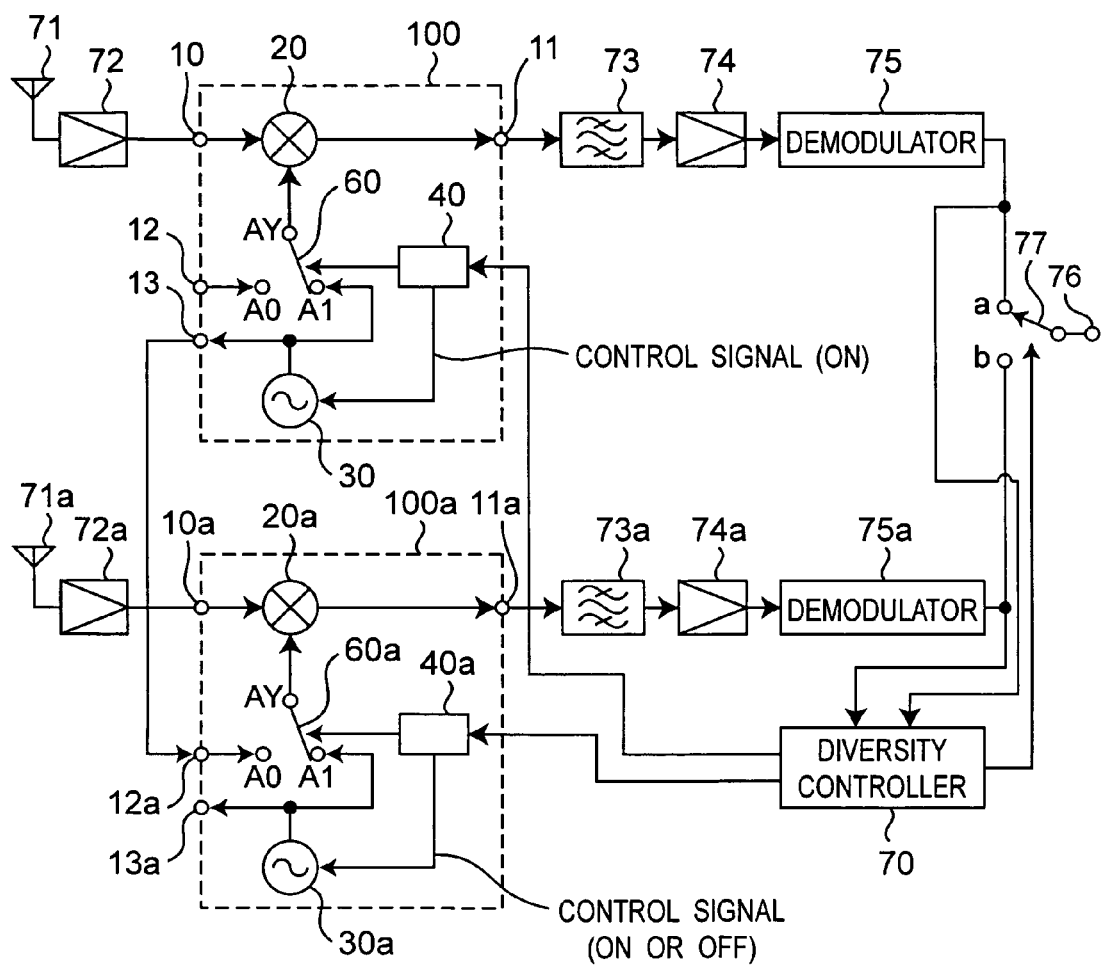
FIG. 6 is a block diagram showing a configuration of a diversity radio receiving apparatus according to a sixth preferred embodiment of the present invention.
Figure 7:
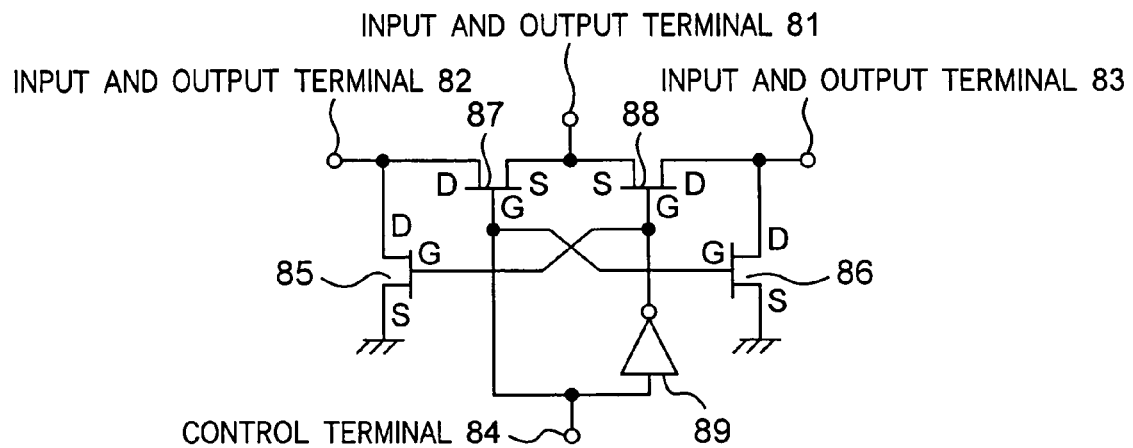
FIG. 7 is a circuit diagram showing a concrete configuration example of switch circuits 60, 60a, 61 and 61a of FIGS. 1 to 6.

In addition, FIG. 7 is a circuit diagram showing a concrete configuration example of the switch circuit 60 of FIG. 1. In addition, the configuration of the switch circuit 60 of FIG. 7 can be applied to switch circuits 60, 60a, 61 and 61a shown in FIGS. 2 to 6 as will be described below. The switch circuit 60 shown in FIG. 7 is provided with three input and output terminals 81, 82 and 83, a control terminal 84, four field effect transistors (referred to as FETs hereinafter) 85, 86, 87 and 88, and an inverter 89. In this case, the input and output terminals 81, 82 and 83 correspond to the common terminal AY, the contact A1 and the contact A0 of the switch circuit 60, respectively. In addition, the control terminal 84 is connected to the control circuit 40.

Referring to FIG. 7, the input and output terminal 81 is connected to source electrodes of the FET 87 and the FET 88, and the input and output terminal 82 is connected to drain electrode of the source-grounded FET 85 and the FET 87, and the input and output terminal 83 is connected to drain electrodes of the source-grounded FET 86 and the FET 88. The control signal inputted through the control terminal 84 is applied to gate electrodes of the FET 86 and the FET 87, and applied to gate electrodes of the FET 85 and the FET 88 through the inverter 89. In addition, it is assumed that the respective FETs 85 to 88 are turned on in response to a high-level voltage signal $V_H$ to their gate electrodes and turned off in response to a low-level voltage signal $V_L$ to their gate electrodes.

According to the switch circuit 60 having the above configuration, when the high-level signal $V_H$ is inputted to the control terminal 84, the FET 86 and the FET 87 are turned on, the FET 85 and the FET 88 are turned off, the input and output terminal 81 is conducted to the input and output terminal 82, and the input and output terminal 83 is grounded. On the other hand, when the low-level signal $V_L$ is inputted to the control terminal 84, the FET 85 and the FET 88 are turned on, the FET 86 and the FET 87 are turned off, the input and output terminal 81 is conducted to the input and output terminal 83, and the input and output terminal 82 is grounded. When the switch circuit 60 having the above configuration is used in the frequency converter 100 shown in FIG. 1, either the local oscillation signal from the incorporated local oscillator 30 or the local oscillation signal from the external circuit can be selected and outputted to the mixer 20.

As described above, according to the radio receiving apparatus including the receiving circuit of the radio receiving apparatus 100 according to the present preferred embodiment, since the power supply to the local oscillator 30 and the input and output of the local oscillation signal can be controlled depending on a usage purpose, unnecessary power consumption of the local oscillator 30 can be reduced, so that the power consumption can be reduced in the receiving circuit as compared with the prior art example.

Second Preferred Embodiment

Figure 2:
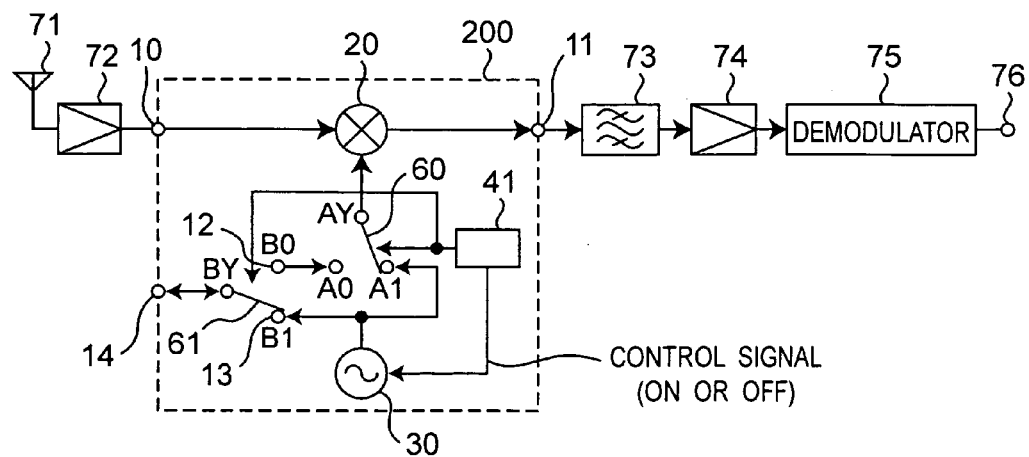
FIG. 2 is a block diagram showing a configuration of a radio receiving apparatus according to a second preferred embodiment of the present invention.

FIG. 2 is a block diagram showing a configuration of a radio receiving apparatus according to a second preferred embodiment of the present invention. The radio receiving apparatus of FIG. 2 is characterized by including a frequency converter 200 instead of the frequency converter 100 as compared with the radio receiving apparatus shown in FIG. 1. In this case, the frequency converter 200 is provided with a high frequency signal input terminal 10, a frequency-converted signal output terminal 11, an oscillation signal input terminal 12, an oscillation signal output terminal 13, an oscillation signal input and output terminal 14, two switch circuits 60 and 61, and a control circuit 41.

Referring to FIG. 2, a local oscillation signal generated by a local oscillator 30 is outputted to a contact B1 serving as the oscillation signal output terminal 13 and a common terminal BY of the switch circuit 61, and the oscillation signal input and output terminal 14, and is outputted to a second input terminal of a mixer 20 through a contact A1 and a common terminal AY of the switch circuit 60. In addition, a local oscillation signal inputted from an external circuit through the oscillation signal input and output terminal 14 is outputted to the mixer 20 through the common terminal BY and the contact B0 of the switch circuit 61, and the contact A0 and the common terminal AY of the switch circuit 60. In addition, the contact B0 of the switch circuit 61 is the local oscillation signal input terminal 12, and the contact B1 of the switch circuit 61 is the local oscillation signal output terminal 13. In this case, a control circuit 41 controls the switch circuit 60 so as to selectively switch over to the contact A0 or the contact A1 thereof, controls the switch circuit 61 so as to selectively switch over to the contact B0 or the contact B1 thereof, and controls turning on and off of operation of the local oscillator 30 using a control signal, that is, controls turning on and off of power supply to the local oscillator 30.

According to the radio receiving apparatus having the above configuration, when the local oscillation signal from the local oscillator 30 incorporated in the frequency converter 200 is selected, the control circuit 41 turns on the power supply to the local oscillator 30, switches over the switch circuit 60 to the contact A1 thereof, and switches over the switch circuit 61 to the contact B1 thereof. At this time, the local oscillation signal from the local oscillator 30 is outputted to the mixer 20 through the contact A1 and the common terminal AY of the switch circuit 60, and is outputted to the external circuit through the contact B1 and the common terminal BY of the switch circuit 61. On the other hand, when the local oscillation signal from the local oscillator 30 of the frequency converter 200 is not used, the local oscillation signal from the external circuit is inputted through the oscillation signal input terminal 14. Then the control circuit 41 turns off the power supply to the local oscillator 30, controls the switch circuit 60 so as to switch over to the contact A0 thereof, and controls the switch circuit 61 so as to switch over to the contact B0 thereof. At this time, the local oscillation signal from the external circuit is outputted to the mixer 20 through the common terminal BY and the contact B0 of the switch circuit 61 and the contact A0 and the common terminal AY of the switch circuit 60.

As described above, according to the frequency converter 200 of the radio receiving apparatus of the present preferred embodiment, since the switch circuit 61 is added and the switch circuit 61 is controlled by the control circuit 41, one terminal can be omitted as compared with the frequency converter 100 of FIG. 1.

In addition, the switch circuit shown in FIG. 7 can be used as the switch circuits 60 and 61. In this case, the input and output terminals 81, 82 and 83 shown in FIG. 7 correspond to the common terminal BY and the contacts B1 and B0 of the switch circuit 61, respectively. Since the switch circuit shown in FIG. 7 includes the FET 85 to the FET 88, it is suitable for selectively switching means which treat bidirectional input and output signals such as the switch circuit 61.

As described above, according to the radio receiving apparatus including the receiving circuit of the radio receiving apparatus 200 of the present preferred embodiment, since the power supply to the local oscillator 30 and the input and output of the local oscillation signal can be controlled depending on a usage purpose, unnecessary power consumption of the local oscillator 30 can be reduced, and the number of terminals can be reduced, so that the power consumption can be reduced in the receiving circuit as compared with the prior art examples.

Third Preferred Embodiment

Figure 3:
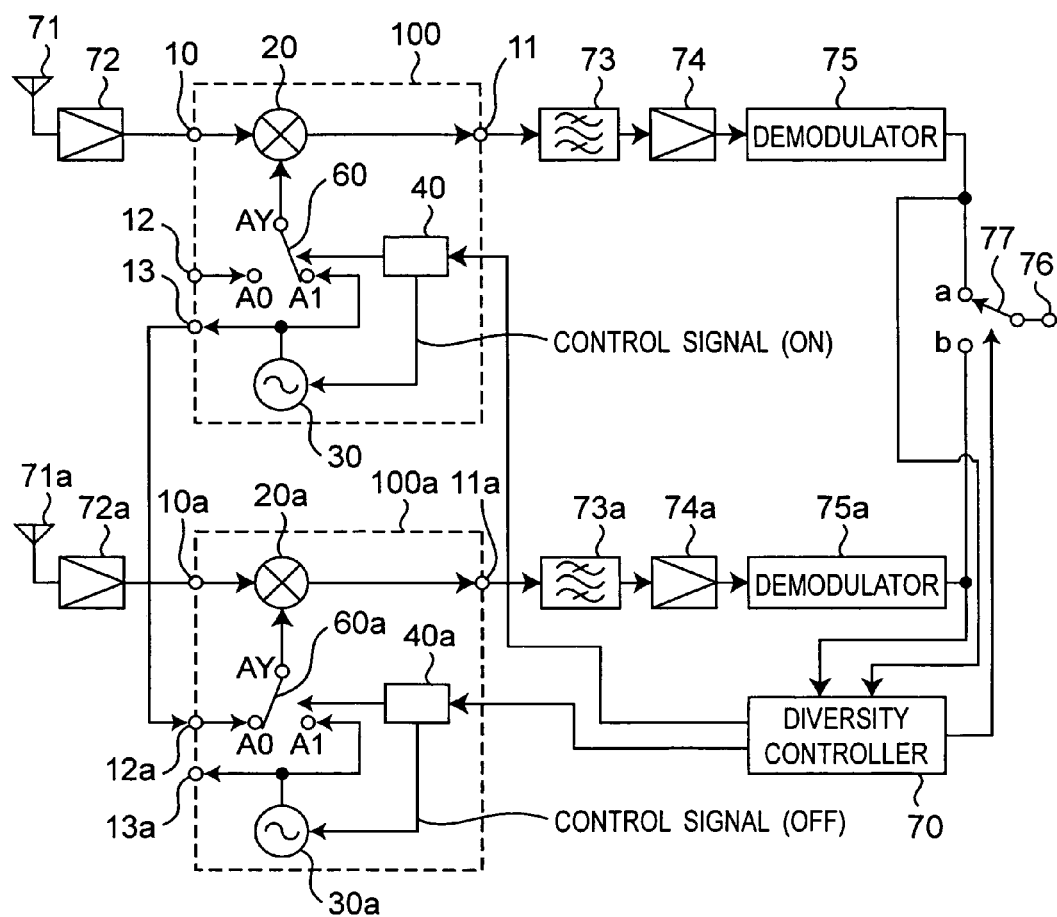
FIG. 3 is a block diagram showing a configuration of a diversity radio receiving apparatus according to a third preferred embodiment of the present invention.

FIG. 3 is a block diagram showing a configuration of a diversity radio receiving apparatus according to a third preferred embodiment of the present invention. The diversity receiving apparatus shown in FIG. 3 is characterized by constituting the diversity receiving apparatus using two radio receiving apparatuses shown in FIG. 1. In this case, a frequency converter 100 and a frequency converter 100a have the same configuration as that of the frequency converter 100 shown in FIG. 1.

Referring to FIG. 3, the first radio receiving apparatus from an antenna 71 to a demodulator 75 is constituted in a manner similar to that of the radio receiving apparatus of FIG. 1. In addition, the second radio receiving apparatus from an antenna 71a to a demodulator 75a includes the antenna 71a, a high frequency amplifier 72a, a frequency converter 100a, a band-pass filter 73a, an intermediate frequency amplifier 74a, and the demodulator 75a, and it is constituted in a manner similar to that of the radio receiving apparatus of FIG. 1. In this case, the frequency converter 100a is provided with a high frequency input terminal 10a, a frequency-converted signal output terminal 11a, an oscillation signal input terminal 12a, an oscillation signal output terminal 13a, a mixer 20a, a local oscillator 30a, and a control circuit 40a, and it is constituted in a manner similar to that of the frequency converter 100. In addition, the oscillation signal input terminal 12a is a contact A0 of a switch circuit 60a, and the oscillation signal output terminal 13a is a contact A1 of a switch circuit 60a. In addition, an oscillation signal output terminal 13 of the frequency converter 100 is connected to the oscillation signal output terminal 12a of the frequency converter 100a.

The antennas 71 and 71a are provided at different positions. The same radio signals having the same radio frequency are received by the antennas 71 and 71a, and the radio signal received by the antenna 71 is inputted to the mixer 20 through a high frequency amplifier 72 and a high frequency signal input terminal 10 of the frequency converter 100, and the radio signal received by the antenna 71a is inputted to the mixer 20a through the high frequency amplifier 72a and the high frequency signal input terminal 10a of the frequency converter 100a. A control circuit 40 turns on power supply to a local oscillator 30, and switches over a switch circuit 60 to a contact A1 thereof. In addition, the control circuit 40a turns off power supply to the local oscillator 30a, and switches over the switch circuit 60a to a contact A0 thereof. In this case, each control processing may be previously set by the control circuits 40 and 40a, and the control circuits 40 and 40a may be controlled by a diversity controller 70 as will be described below. Therefore, a local oscillation signal from a local oscillator 30 is outputted to the mixer 20 through the contact A1 and a common terminal AY of the switch circuit 60, and is outputted to the mixer 20a through a local oscillation signal output terminal 13, a local oscillation signal input terminal 12a of the local oscillator 100a and a contact A0 and a common terminal AY of the switch circuit 60a. Then, a signal processing from the mixer 20 to the demodulator 75 through a band-pass filter 73 and an intermediate frequency amplifier 74 is performed in a manner similar to that of the radio receiving apparatus of FIG. 1. In addition, a signal processing from the mixer 20a to the demodulator 75a through the band-pass filter 73a and the intermediate frequency amplifier 74a is performed also in a manner similar to that of the radio receiving apparatus of FIG. 1.

A demodulated base band signal from the demodulator 75 is outputted to an output terminal 76 through a contact "a" of a switch 77 and a demodulated base band signal from the demodulator 75a is outputted to the output terminal 76 through a contact "b" of the switch 77. The diversity controller 70 detects a signal quality of the base band signal from each of the demodulators 75 and 75a (when the radio signal is demodulated by digital modulation method, for example, it is a bit error rate), and performs a diversity receiving processing by switching the switch 77 so as to select the base band signal having a higher signal quality.

According to the diversity radio receiving apparatus having the above configuration, the radio signal is received by each of the antennas 71 and 71a arranged in the different positions, and the high frequency signals correspond to the two radio signals having the different radio waves are inputted to the frequency converters 100 and 100a. In a manner similar to that of the frequency converter 100 of FIG. 1, each of the frequency converters 100 and 100a performs frequency converting processing using the local oscillation signal from the local oscillator 30, and an intermediate frequency signal having an intermediate frequency is outputted from each of the frequency converters 100 and 100a. Thus, the diversity controller 70 performs the diversity receiving processing to improve the receiving state by switching the switch 77 so as to select the base band signal having a more preferable receiving state and a higher signal quality.

According to the present preferred embodiment, current consumption is reduced by an amount for one local oscillator since the power supply to the local oscillator 30a of the frequency converter 100a is turned off. Also according to the present preferred embodiment, interference between the local oscillation signals generated by the local oscillators 30 and 30a does not cause since only one local oscillator operates. Thus, the preferable receiving state can be maintained. As described above, only the local oscillator 30 of one frequency converter 100 operates to supply the local oscillation signal to the other local oscillator 100a. Thus, the diversity receiving apparatus can maintain the preferable receiving state with lower power consumption in the frequency converters 100 and 100a incorporating the local oscillators 30 and 30a, respectively.

Although two radio receiving apparatuses are used in the above preferred embodiment, the present invention is not limited to this. As another example, a diversity receiving apparatus may be constituted by three or more radio receiving apparatuses, and the same thing can be applied to the preferred embodiments shown in FIGS. 4 and 6 as will be described below. In that case, only the local oscillator 30 of one frequency converter 100 operates, and an oscillation signal output terminal 13 of the frequency converter 100 including the local oscillator 30 to which the electric power is supplied is connected to a local oscillation signal input terminal 12 of frequency converters (100a and the like) including local oscillators (30a and the like) to which the electric power is not supplied, so that the local oscillation signal is supplied from the frequency converter 100 to the other frequency converters (100a and the like).

Although the diversity controller 70 switches over the switch 77 so that the base signal having the higher signal quality may be selected based on the signal quality of each base band signal in the above preferred embodiments, the present invention is not limited to this. For example, it may switch over the switch 77 so that the base band signal having a higher signal quality may be selected based on a signal quality such as a signal level of the intermediate frequency signal or the high frequency signal, for example. The same thing can be applied to the following preferred embodiments.

Fourth Preferred Embodiment

Figure 4:
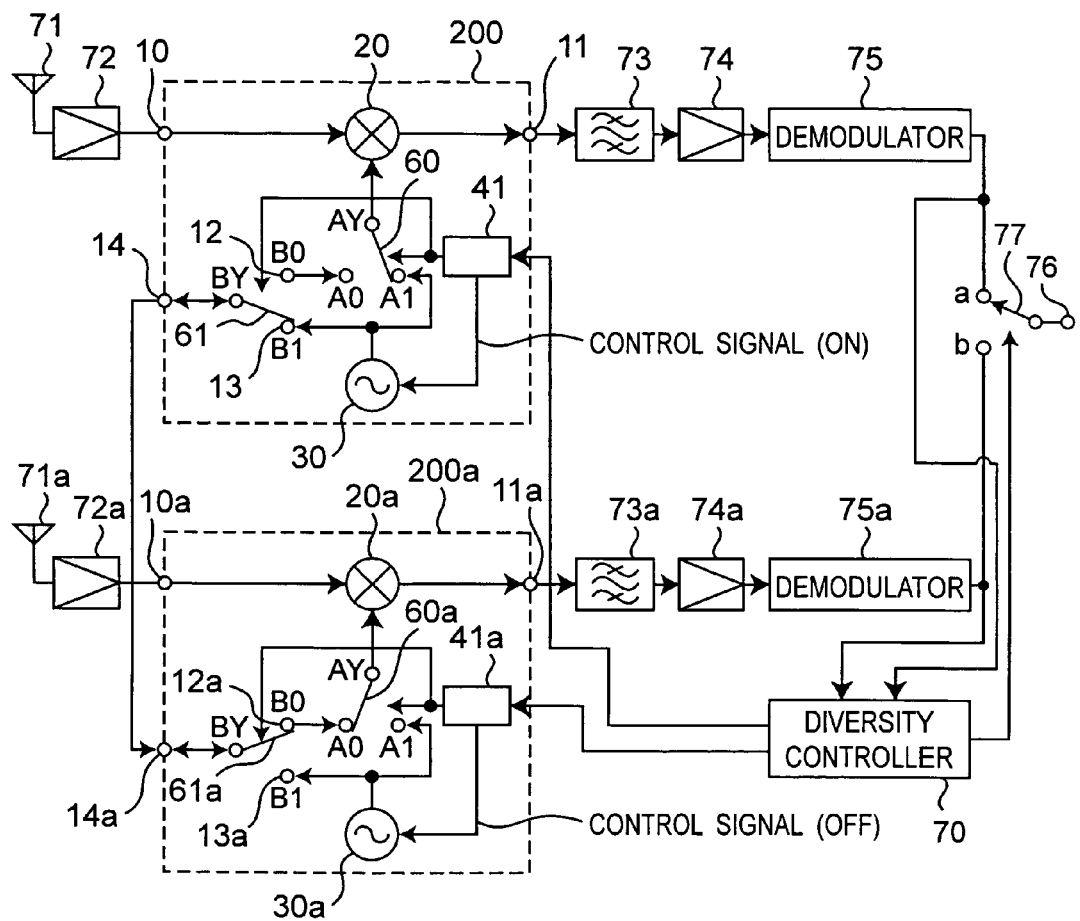
FIG. 4 is a block diagram showing a configuration of a diversity radio receiving apparatus according to a fourth preferred embodiment of the present invention.

FIG. 4 is a block diagram showing a configuration of a diversity radio receiving apparatus according to a fourth preferred embodiment of the present invention. The diversity radio receiving apparatus shown in FIG. 4 is different from the diversity radio receiving apparatus shown in FIG. 3 in the following points.

(1) The frequency converter 200 shown in FIG. 2 is provided instead of the frequency converter 100 shown in FIG. 3.

(2) A frequency converter 200a having a configuration similar to that of the frequency converter 200 shown in FIG. 2 is provided instead of the frequency converter 100a shown in FIG. 3. In this case, the frequency converter 200a includes a high frequency signal input terminal 10a, a frequency-converted signal output terminal 11a, an oscillation signal input terminal 12a, an oscillation signal output terminal 13a, an oscillation signal input and output terminal 14a, two switch circuits 60a and 61a, and a control circuit 41a.

(3) A control circuit 41 turns on power supply to a local oscillator 30, switches over a switch circuit 60 to a contact A1 thereof, and switches over a switch circuit 61 to a contact B1 thereof.

(4) The control circuit 41a turns on power supply to a local oscillator 30a, switches over the switch circuit 60a to a contact A0 thereof, and switches over the switch circuit 61a to a contact B0 thereof.

According to the diversity radio receiving apparatus having the above configuration, a local oscillation signal from the local oscillator 30 is outputted to the mixer 20 through the contact A1 and a common terminal AY of the switch circuit 60. In addition, the local oscillation signal is outputted to a mixer 20a through a contact B1 and a common terminal BY of the switch circuit 61, a local oscillation signal input and output terminal 14, the local oscillation signal input and output terminal 14a of the frequency converter 200a, a common terminal BY and the contact B0 of the switch circuit 61a, and the contact A0 and a common terminal AY of the switch circuit 60a.

According to the present preferred embodiment, current consumption is reduced by an amount for one local oscillator since the power supply to the local oscillator 30a of the frequency converter 200a is turned off. In addition, according to the present preferred embodiment, interference between the local oscillation signals generated by the local oscillators 30 and 30a does not cause since only one local oscillator operates. Thus, the preferable receiving state can be maintained. As described above, only the local oscillator 30 provided in one frequency converter 200 operates to supply the local oscillation signal to the other frequency converter 200a. Thus, the diversity receiving apparatus can maintain the preferable receiving state with lower power consumption in the frequency converters 200 and 200a incorporating the local oscillators 30 and 30a, respectively.

Fifth Preferred Embodiment

Figure 5:
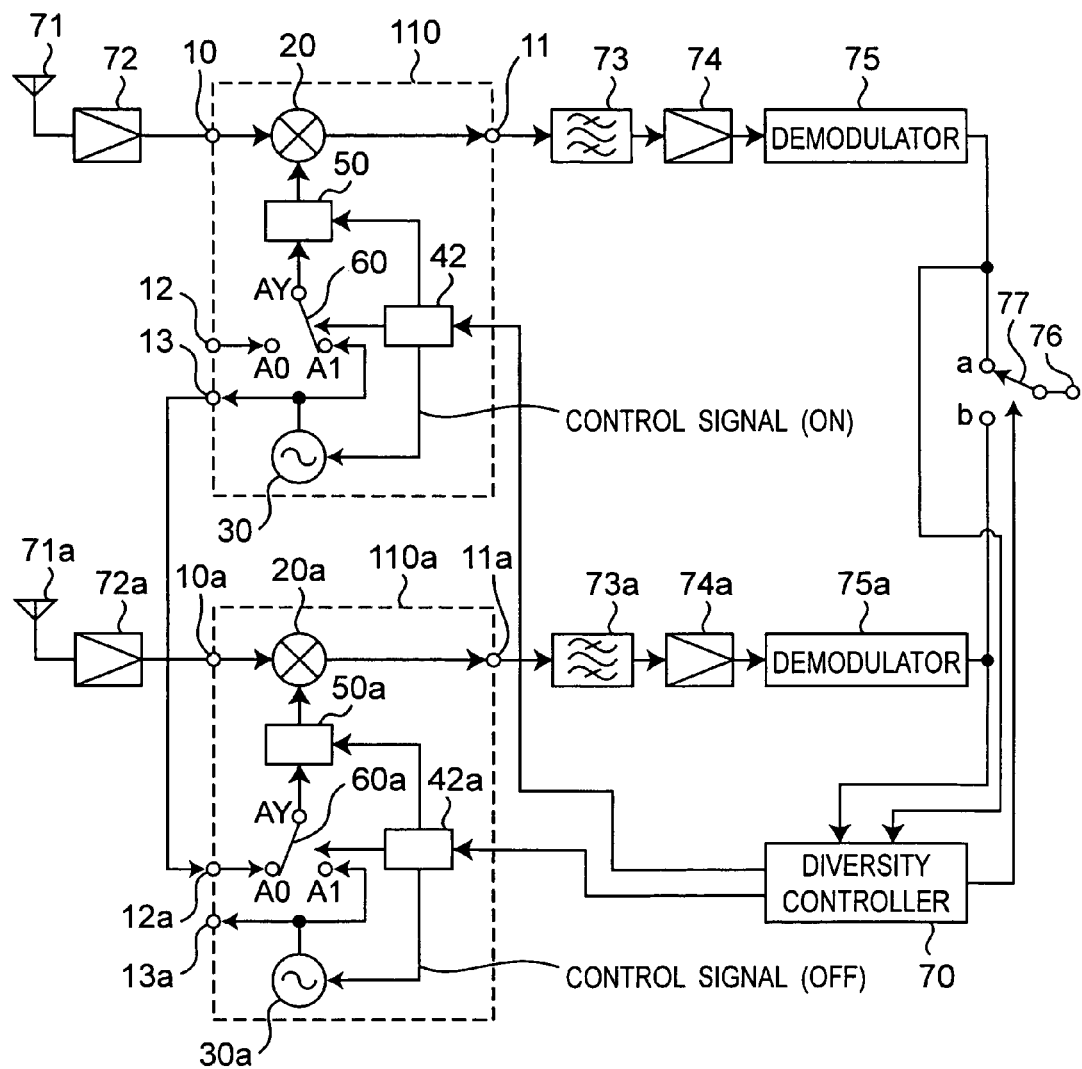
FIG. 5 is a block diagram showing a configuration of a diversity radio receiving apparatus according to a fifth preferred embodiment of the present invention.

FIG. 5 is a block diagram showing a configuration of a diversity radio receiving apparatus according to a fifth preferred embodiment of the present invention. The diversity radio receiving apparatus shown in FIG. 5 is different from the diversity radio receiving apparatus shown in FIG. 3 in the following points.

(1) A phase shifter 50 for shifting a phase by a shift amount controlled by a control circuit 42 is provided between a common terminal AY of a switch circuit 60 and a second input terminal of a mixer 20 in a frequency converter 110 replaced with the frequency converter 100.

(2) A phase shifter 50a for shifting a phase by a shift amount controlled by a control circuit 42a is provided between a common terminal AY of a switch circuit 60a and a second input terminal of a mixer 20a in a frequency converter 110a replaced with the frequency converter 100a.

(3) The control circuit 42 performs the control processing of the control circuit 40, and controls a shift amount of the phase shifter 50.

(4) The control circuit 42a performs the control processing of the control circuit 40a, and controls a shift amount of the phase shifter 50a.

(5) The control circuits 42 and 42a control the shift amount of the phase shifters 50 and 50a so that the phases of two local oscillation signals inputted to the mixers 20 and 20a may become the same substantially, respectively.

According to the diversity radio receiving apparatus shown in FIG. 3, since the local oscillation signal from the frequency converter 100 is used in the frequency converter 100a, the phase of the local oscillation signal supplied to the frequency converter 100a is delayed due to parasitic resistance or parasitic capacitance of wirings in and out of the frequency converter 100 and frequency converter 100a or their input terminals or output terminals. Therefore, a phase difference is caused between the local oscillation signal inputted to the second input terminal of the mixer 20 of the frequency converter 100, and the oscillation signal supplied to the second input terminal of the mixer 20a of the frequency converter 100a. As a result, there is such a problem that a phase difference is also generated in two frequency-converted signals from the frequency-converted signal output terminals 11 and 11a of the frequency converter 100a and 100a. In this case, when a frequency-converted signal which corresponds to the base band signal having a preferable receiving state is selected from the two frequency-converted signals from the two frequency-converted signal output terminals 11 and 11a and demodulated into a base band signal to be outputted, a phase difference is caused between the base band signals at the time of switching the base band signals by the switch 77, so that a time interval in which the phase is not continuous is caused. In particular, when a high frequency signal inputted to each of high frequency signal input terminals 10 and 10*a* is demodulated by a phase demodulating method, the phase of the frequency-converted signal becomes discontinuous, and an error could be generated in data of the base band signal at that time. Thus, by adjusting the sift amounts of the phase shifters 50 and 50*a* so that a phase difference between the local oscillation signal to be inputted to the second input terminal of the mixer 20 of the frequency converter 110 from the phase shifter 50 and the local oscillation signal to be inputted to the second input terminal of the mixer 20*a* of the frequency converter 110*a* from the phase shifter 50*a* may become substantially zero, and the two local oscillation signals may be supplied to the mixers 20 and 20*a* in common mode, any time interval in which the phase is discontinuous is not caused in the above base band signal, so that any error also does not generate in received data.

Figure 8:
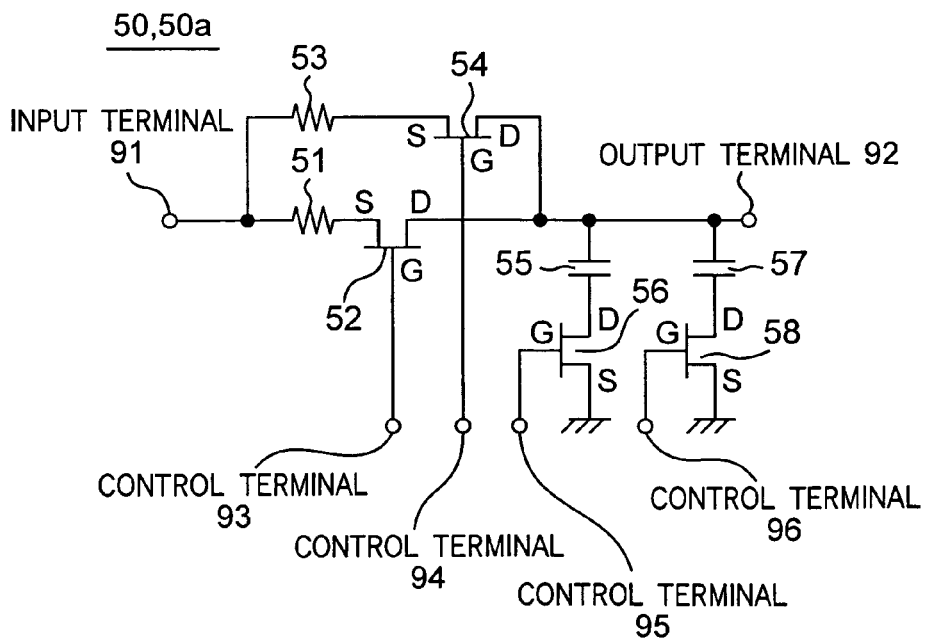
FIG. 8 is a circuit diagram showing a concrete configuration example of phase shifters 50 and 50a of FIG. 5.

FIG. 8 is a circuit diagram showing a configuration of the phase shifters 50 and 50*a* of FIG. 5. Each of the phase shifters 50 and 50*a* is provided with an input terminal 91, an output terminal 92, four control terminals 93, 94, 95 and 96, two resistors 51 and 53, four FETs 52, 54, 56 and 58, and two capacitors 55 and 57. The input terminal 91 is connected to the common terminal AY of each of the switch circuits 60 and 60*a*, the output terminal 92 is connected to the second input terminal of each of the mixers 20 and 20*a*, and the control terminals 93, 94, 95 and 96 are connected to the control circuit 42 or 42*a*.

Referring to FIG. 8, the input terminal 91 is connected to the output terminal 92 through the resistor 51 and the source and drain of the FET 52, and the gate of the FET 52 is connected to the control terminal 93. In addition, the input terminal 91 is connected to the output terminal 92 through the resistor 53 and the source and the drain of the FET 54, and the gate of the FET 54 is connected to the control terminal 94. Furthermore, the output terminal 92 is grounded through the capacitor 55 and the drain and the source of the FET 56, and the gate of the FET 56 is connected to the control terminal 95. In addition, the output terminal 92 is grounded through the capacitor 57 and the drain and the source of the FET 58, and the gate of the FET 58 is connected to the control terminal 96.

According to the phase shifters 50 and 50*a* having the above configurations, the FETs 52, 54, 56 and 58 are turned on or off by the control signals inputted from the control circuit 42 or 42*a* through the control terminals 93 to 96, so that a combined resistance value and a combined capacitance value of the low-pass filter of the resistors 51 and 53 and capacitors 55 and 57 can be changed. In this case, when it is assumed that the combined resistance value of the resistors 51 and 53 is R, and the combined capacitance value of the capacitors 55 and 57 is C, a phase difference $\Delta\theta$ between the local oscillation signals at the input terminal 91 and the output terminal 92 in a case a local oscillation signal having a local oscillation frequency $f_{LO}$ is inputted from the input terminal 91, and is outputted from the output terminal 92 is represented by the following equation (2):

$$\Delta\theta = -\tan^{-1}(2\pi f_{LO}CR) \qquad (2).$$

As can be apparent from the above equation (2), by adjusting the combined resistance value R and the combined capacitance value C in the frequency $f_{LO}$ of the inputted local oscillation signal, an optimal phase difference $\Delta\theta$ can be set. Furthermore, by frequency characteristics of a filter gain of the low-pass filter, a harmonic component of the local oscillation signal can be attenuated, and a harmonic component of the frequency-converted signal at each of the frequency-converted signal output terminals 11 and 11*a* can be attenuated, so that preferable reception frequency characteristics can be implemented.

In addition, although the two resistors 51 and 53 and the two capacitors 55 and 57 are used in the example of FIG. 8, the present invention is not limited to this, and one or more resistors or capacitors may be used. In addition, although at least one of the combined resistance value and the combined capacitance value is changed by selectively connecting the components to be used among the resistors 51 and the 53 and the capacitors 55 and 57 by turning on or off of the FETs 52, 54, 56 and 58 in the example shown in FIG. 8, the present invention is not limited to this, and the combined capacitance value may be changed by using a varactor diode instead of the capacitors 55 and 57, or by connecting the varactor diode to the capacitors 55 and 57 in parallel or in series and changing a reversely biased DC voltage to be applied to the varactor diode.

As described above, according to the present preferred embodiment, since only the local oscillator 30 of the frequency converter 110 operates to supply the local oscillation signal to the mixer 20*a* of the other frequency converter 110*a*, and phases of the frequency-converted signals outputted from the two frequency-converted signal output terminals 11 and 11*a* can be set to be equal to each other substantially, the diversity receiving apparatus can solve the above-mentioned problems due to the phase difference and maintain a preferable receiving state with low power consumption.

In addition, although the phase shifter 50 and 50*a* are further provided in the diversity radio receiving apparatus shown in FIG. 3 in the above preferred embodiment, the present invention is not limited to this, and the phase shifters 50 and 50*a* may be further provided in the diversity radio receiving apparatus shown in FIG. 4.

Sixth Preferred Embodiment

FIG. 6 is a block diagram showing a configuration of a diversity radio receiving apparatus according to a sixth preferred embodiment of the present invention. As compared with the diversity radio receiving apparatus of FIG. 5, the diversity radio receiving apparatus of FIG. 6 is characterized in that power supplies to local oscillators 30 and 30*a* in frequency converters 100 and 100*a* and switching control of switch circuits 60 and 60*a* are changed according to two cases as follows. One is a case (referred to as a first case hereinafter) in which a first radio receiving apparatus including an antenna 71 and a second radio receiving apparatus including an antenna 71*a* receive radio signals having the same radio frequency $f_{RF}$. The other is a case (referred to as a second case hereinafter) in which the first radio receiving apparatus including the antenna 71 and the second radio receiving apparatus including the antenna 71*a* receive two radio signals having different radio frequencies $f_{RF1}$ and $f_{RF2}$. The description thereof will be made in detail hereinafter.

According to the first case, the control circuit 40 turns on the power supply to the local oscillator 30, and controls the switch circuit 60 so as to switch over to a contact A1 thereof. In addition, the control circuit 40*a* turns off the power supply to the local oscillator 30*a*, and controls the switch circuit 60*a* so as to switch over to a contact A0 thereof. At this time, a local oscillation signal from the local oscillator 30 of the frequency converter 100 is outputted to the mixer 20, and is outputted to the mixer 20*a* of the frequency converter 100*a*, and the diversity radio receiving apparatus performs a diversity radio receiving processing in a manner similar to that of the diversity radio receiving apparatus of FIG. 5.

Then, according to the second case, the control circuit 40 turns on the power supply to the local oscillator 30, and controls the switch circuit 60 so as to switch over to the contact A1 thereof. In addition, the control circuit 40*a* turns on the power supply to the local oscillator 30*a*, and controls the switch circuit 60*a* so as to switch over to a contact A1 thereof. In this case, a local oscillation frequency $f_{LO1}$ of the local oscillation signal generated by the local oscillator 30 and a local oscillation frequency $f_{LO2}$ of the local oscillation signal generated by the local oscillator 30*a* are set so as to correspond to a frequency difference between the radio frequencies $f_{RF1}$ and $f_{RF2}$ of the received radio signals, so that their intermediate frequencies of intermediate frequency signals become the same substantially, and so that the local oscillation frequencies $f_{LO1}$ and $f_{LO2}$ are different from each other. That is, in order to output an intermediate frequency signal having substantially the same intermediate frequency $f_{IF}$ from the two frequency-converted signal output terminals 11 and 11*a*, the local oscillator 30 of the frequency converter 100 is to generate a local oscillation signal having a local oscillation frequency of $f_{RF1} \pm f_{IF}$, and the local oscillator 30*a* of the frequency converter 100*a* is to generate a local oscillation signal having a local oscillation frequency of $f_{RF2} \pm f_{IF}$.

In addition, when a receiving system is so constituted that a case (or operation) of a configuration in which a base band signal is outputted from each of demodulators 75 or 75*a* without limiting its circuit to the circuit of FIG. 6 (referred to as a modified preferred embodiment of the sixth preferred embodiment, and a case (or operation) of diversity radio reception in which a base band signal having a higher signal quality is selected as shown in the circuit of FIG. 6 can be switched over, the radio receiving apparatus can carry out a diversity receiving processing or receive two radio signals having different radio frequencies depending on the case. For example, when the diversity radio receiving processing is not performed, one radio receiving apparatus may be connected to a memory unit of received data of the base band signal, or used for searching a channel, and alternatively, two broadcast wave signals or two communication wave signals can be displayed on a screen.

As described above, the diversity receiving apparatus can receive two radio signals by switching the power supply to the local oscillators 30 and 30*a* of the frequency converters 100 and 100*a*, or the switch circuits 60 and 60*a* depending on the case.

In addition, although the description has been made of the diversity radio receiving apparatus shown in FIG. 3 of the above preferred embodiment, the present invention is not limited to this, and the diversity radio receiving apparatus shown in FIG. 4 or 5 may be used.

Modified Preferred Embodiments

Although the radio receiving apparatus or diversity radio receiving apparatus have been described in the above preferred embodiments, the present invention is not limited to this, and the present invention can be applied to a tuner or a receiving apparatus such as a wired receiving apparatus which receives a high frequency signal transmitted through a wired transmission line such as a coaxial cable.

As described above, according to the receiving circuit including the frequency converters 100 and 100*a* of the present invention, unnecessary power consumption of the local oscillator can be reduced. In addition, according to the receiving apparatus of the present invention, since the apparatus can be miniaturized, and power consumption is low and the plurality of signals can be received depending on the case as compared with the prior art examples, it is suitable for the receiving apparatus such as a tuner required for portability, long receiving time, and high functionality.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A receiving circuit including a local oscillation signal output terminal and a local oscillation signal input terminal, said receiving circuit comprising:

a mixer for mixing an inputted high frequency signal with an inputted local oscillation signal by multiplication to convert the high frequency signal into a predetermined frequency-converted signal, and for outputting the frequency-converted signal;

a local oscillator for generating a local oscillation signal having a predetermined local oscillation frequency, and for outputting the local oscillation signal;

a first switch circuit for switching over between first and second cases, said first switch circuit in the first case outputting the local oscillation signal outputted from the local oscillator to said mixer, and outputting the local oscillation signal through the local oscillation signal output terminal, and said first switch circuit in the second case outputting a local oscillation signal inputted through the local oscillation signal input terminal to said mixer; and a controller for controlling in the first case to turn on power supply to the local oscillator, and controlling the first switch circuit in the first case to output the local oscillation signal outputted from the local oscillator to said mixer, and to output the local oscillation signal through the local oscillation signal output terminal, and for controlling in the second case to turn off power supply to the local oscillator, and controlling the first switch circuit in the second case to output the local oscillation signal inputted through the local oscillation signal input terminal to said mixer.

2. The receiving circuit as claimed in claim 1, further comprising:

a local oscillation signal input and output terminal; and a second switch circuit for switching over between the first and second cases, said second switch circuit in the first case outputting the local oscillation signal outputted from the local oscillator through the local oscillation signal output terminal and the local oscillation signal input and output terminal, and said second switch circuit in the second case outputting the local oscillation signal inputted through the local oscillation signal input and output terminal to said mixer through the local oscillation signal input terminal and the first switch circuit, wherein said controller further controls the second switch circuit in the first case to output the local oscillation signal outputted from the local oscillator through the local oscillation signal output terminal and the local oscillation signal input and output terminal, and controls the second switch circuit in the second case to output the local oscillation signal inputted through the local oscillation signal input and output terminal to said mixer through the local oscillation signal input terminal and the first switch circuit.

3. A receiving apparatus comprising a plurality of receiving circuits including first and second receiving circuits, each of said first and second receiving circuits comprising:

a mixer for mixing an inputted high frequency signal with an inputted local oscillation signal by multiplication to convert the high frequency signal into a predetermined frequency-converted signal, and for outputting the frequency-converted signal;

a local oscillator for generating a local oscillation signal having a predetermined local oscillation frequency, and for outputting the local oscillation signal;

a first switch circuit for switching over between first and second cases, said first switch circuit in the first case outputting the local oscillation signal outputted from the local oscillator to said mixer, and outputting the local oscillation signal through the local oscillation signal output terminal, and said first switch circuit in the second case outputting a local oscillation signal inputted through the local oscillation signal input terminal to said mixer; and a controller for controlling in the first case to turn on power supply to the local oscillator, and controlling the first switch circuit in the first case to output the local oscillation signal outputted from the local oscillator to said mixer, and to output the local oscillation signal through the local oscillation signal output terminal, and for controlling in the second case to turn off power supply to the local oscillator, and controlling the first switch circuit in the second case to output the local oscillation signal inputted through the local oscillation signal input terminal to said mixer, wherein the local oscillation signal output terminal of said first receiving circuit is connected to the local oscillation signal input terminal of said second receiving circuit, wherein said controller of the first receiving circuit controls the first receiving circuit to turn on power supply to the local oscillator, controls the first switch circuit to output the local oscillation signal outputted from the local oscillator to said mixer, and to output the local oscillation signal to said mixer of the second receiving circuit through the oscillation signal output terminal, and wherein said controller of the second receiving circuit controls the second receiving circuit to turn off power supply to the local oscillator, and controls the first switch circuit to and to output the local oscillation signal inputted through the local oscillation signal input terminal to said mixer.

4. The receiving apparatus as claimed in claim 3,
wherein said first receiving circuit further includes first phase shifter provided between the first switch circuit and said mixer, said first phase shifter adjusting a phase shift amount of the local oscillation signal, wherein said second receiving circuit further includes second phase shifter provided between the first switch circuit and said mixer, said second phase shifter adjusting a phase shift amount of the local oscillation signal, and wherein said first and second controller controls the phase shift amount of the first phase shifter and the phase shift amount of the second phase shifter so that the phase of the local oscillation signal inputted to said mixer of the first receiving circuit and the phase of the local oscillation signal inputted to said mixer of the second receiving circuit become substantially in-phase.

5. The receiving apparatus as claimed in claim 4, further comprising a diversity receiving device, wherein high frequency signals having substantially the same radio frequency are inputted to said mixer of the first receiving circuit and said mixer of the second receiving circuit, wherein said diversity receiving device demodulates a first frequency-converted signal outputted from said mixer of the first receiving circuit into a first demodulated signal, and demodulates a second frequency-converted signal outputted from said mixer of the second receiving circuit into a second demodulated signal, and performs one of (a) a first processing of selecting and outputting a demodulated signal obtained from the frequency-converted signal and having a higher signal quality based on signal qualities of the first and the second frequency-converted signals, and (b) a second processing of selecting and outputting a demodulated signal having a higher signal quality based on signal qualities of the first and the second demodulated signals.

6. The receiving apparatus as claimed in claim 4, further comprising a demodulator, wherein high frequency signals having different radio frequencies are inputted to said mixer of the first receiving circuit and said mixer of the second receiving circuit, and wherein said demodulator demodulates a first frequency-converted signal outputted from said mixer of the first receiving circuit into a first demodulated signal, and outputs the first demodulated signal, and wherein said demodulator demodulates a second frequency-converted signal outputted from said mixer of the second receiving circuit into a second demodulated signal, and outputs the second demodulated signal.

7. The receiving apparatus as claimed in claim 3, further comprising a diversity receiving device, wherein high frequency signals having substantially the same radio frequency are inputted to said mixer of the first receiving circuit and said mixer of the second receiving circuit, and wherein said diversity receiving device demodulates a first frequency-converted signal outputted from said mixer of the first receiving circuit into a first demodulated signal, and demodulates a second frequency-converted signal outputted from said mixer of the second receiving circuit into a second demodulated signal, and performs one of (a) a first processing of selecting and outputting a demodulated signal obtained from the frequency-converted signal and having a higher signal quality based on signal qualities of the first and the second frequency-converted signals, and (b) a second processing of selecting and outputting a demodulated signal having a higher signal quality based on signal qualities of the first and the second demodulated signals.

8. The receiving apparatus as claimed in claim 3, further comprising a demodulator, wherein high frequency signals having different radio frequencies are inputted to said mixer of the first receiving circuit and said mixer of the second receiving circuit, and wherein said demodulator demodulates a first frequency-converted signal outputted from said mixer of the first receiving circuit into a first demodulated signal, and outputs the first demodulated signal, and wherein said demodulator demodulates a second frequency-converted signal outputted from said mixer of the second receiving circuit into a second demodulated signal, and outputs the second demodulated signal.

9. A receiving apparatus comprising a plurality of receiving circuits including first and second receiving circuits, each of said first and second receiving circuits comprising:
- a mixer for mixing an inputted high frequency signal with an inputted local oscillation signal by multiplication to convert the high frequency signal into a predetermined frequency-converted signal, and for outputting the frequency-converted signal;
- a local oscillator for generating a local oscillation signal having a predetermined local oscillation frequency, and for outputting the local oscillation signal;
- a first switch circuit for switching over between first and second cases, said first switch circuit in the first case outputting the local oscillation signal outputted from the local oscillator to said mixer, and outputting the local oscillation signal through the local oscillation signal output terminal, and said first switch circuit in the second case outputting a local oscillation signal inputted through the local oscillation signal input terminal to said mixer;
- a controller for controlling in the first case to turn on power supply to the local oscillator, and controlling the first switch circuit in the first case to output the local oscillation signal outputted from the local oscillator to said mixer, and to output the local oscillation signal through the local oscillation signal output terminal, and for controlling in the second case to turn off power supply to the local oscillator, and controlling the first switch circuit in the second case to output the local oscillation signal inputted through the local oscillation signal input terminal to said mixer;
- a local oscillation signal input and output terminal; and
- a second switch circuit for switching over between the first and second cases, said second switch circuit in the first case outputting the local oscillation signal outputted from the local oscillator through the local oscillation signal output terminal and the local oscillation signal input and output terminal, and said second switch circuit in the second case outputting the local oscillation signal inputted through the local oscillation signal input and output terminal to said mixer through the local oscillation signal input terminal and the first switch circuit,
- wherein said controller further controls the second switch circuit in the first case to output the local oscillation signal outputted from the local oscillator through the local oscillation signal output terminal and the local oscillation signal input and output terminal, and controls the second switch circuit in the second case to output the local oscillation signal inputted through the local oscillation signal input and output terminal to said mixer through the local oscillation signal input terminal and the first switch circuit,
- wherein the local oscillation signal input and output terminal of the first receiving circuit is connected to the local oscillation signal input and output terminal of the second receiving circuit,
- wherein said controller of the first receiving circuit controls the first receiving circuit to turn on power supply to the local oscillator, and controls the first and second switch circuits to output the local oscillation signal outputted from the local oscillator to said mixer, and to output the local oscillation signal to said mixer of the second receiving circuit through the local oscillation signal input and output terminal, the second switch circuit and the local oscillation signal input and output terminal,
- wherein said controller of the second receiving circuit controls the second receiving circuit to turn off power supply to local oscillator, and controls the first and second switch circuits to output the local oscillation signal inputted from the first receiving circuit through the local oscillation signal input and output terminal to said mixer through the second switch circuit, the local oscillation signal input terminal and the first switch circuit.

10. The receiving apparatus as claimed in claim 9,
- wherein said first receiving circuit further includes first phase shifter provided between the first switch circuit and said mixer, said first phase shifter adjusting a phase shift amount of the local oscillation signal,
- wherein said second receiving circuit further includes second phase shifter provided between the first switch circuit and said mixer, said second phase shifter adjusting a phase shift amount of the local oscillation signal, and
- wherein said first and second controller controls the phase shift amount of the first phase shifter and the phase shift amount of the second phase shifter so that the phase of the local oscillation signal inputted to said mixer of the first receiving circuit and the phase of the local oscillation signal inputted to said mixer of the second receiving circuit become substantially in-phase.

11. The receiving apparatus as claimed in claim 10, further comprising a diversity receiving device,
- wherein high frequency signals having substantially the same radio frequency are inputted to said mixer of the first receiving circuit and said mixer of the second receiving circuit,
- wherein said diversity receiving device demodulates a first frequency-converted signal outputted from said mixer of the first receiving circuit into a first demodulated signal, and demodulates a second frequency-converted signal outputted from said mixer of the second receiving circuit into a second demodulated signal, and performs one of (a) a first processing of selecting and outputting a demodulated signal obtained from the frequency-converted signal and having a higher signal quality based on signal qualities of the first and the second frequency-converted signals, and (b) a second processing of selecting and outputting a demodulated signal having a higher signal quality based on signal qualities of the first and the second demodulated signals.

12. The receiving apparatus as claimed in claim 10, further comprising a demodulator,
- wherein high frequency signals having different radio frequencies are inputted to said mixer of the first receiving circuit and said mixer of the second receiving circuit, and
- wherein said demodulator demodulates a first frequency-converted signal outputted from said mixer of the first receiving circuit into a first demodulated signal, and outputs the first demodulated signal, and
- wherein said demodulator demodulates a second frequency-converted signal outputted from said mixer of the second receiving circuit into a second demodulated signal, and outputs the second demodulated signal.

13. The receiving apparatus as claimed in claim 9, further comprising a diversity receiving device,
- wherein high frequency signals having substantially the same radio frequency are inputted to said mixer of the first receiving circuit and said mixer of the second receiving circuit,
- wherein said diversity receiving device demodulates a first frequency-converted signal outputted from said mixer of the first receiving circuit into a first demodulated signal, and demodulates a second frequency-converted signal outputted from said mixer of the second receiving circuit into a second demodulated signal, and performs one of (a) a first processing of selecting and outputting a demodulated signal obtained from the frequency-converted signal and having a higher signal quality based on signal qualities of the first and the second frequency-converted signals, and (b) a second processing of selecting and outputting a demodulated signal having a higher signal quality based on signal qualities of the first and the second demodulated signals.

14. The receiving apparatus as claimed in claim 9, further comprising a demodulator, wherein high frequency signals having different radio frequencies are inputted to said mixer of the first receiving circuit and said mixer of the second receiving circuit, and wherein said demodulator demodulates a first frequency-converted signal outputted from said mixer of the first receiving circuit into a first demodulated signal, and outputs the first demodulated signal, and wherein said demodulator demodulates a second frequency-converted signal outputted from said mixer of the second receiving circuit into a second demodulated signal, and outputs the second demodulated signal.

* * * * *